US012551459B2

(12) United States Patent
Ghahary et al.

(10) Patent No.: US 12,551,459 B2
(45) Date of Patent: Feb. 17, 2026

(54) COMBINATION OF KYNURENINE AND ANTIGEN PRESENTING CELLS (APC) AS THERAPEUTICS AND METHODS FOR THEIR USE IN IMMUNE MODULATION

(71) Applicant: THE UNIVERSITY OF BRITISH COLUMBIA, Vancouver (CA)

(72) Inventors: Aziz Ghahary, Vancouver (CA); Reza B. Jalili, Vancouver (CA); Ruhangiz T. Kilani, Vancouver (CA); Yunyuan Li, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 288 days.

(21) Appl. No.: 15/514,680

(22) PCT Filed: Sep. 25, 2015

(86) PCT No.: PCT/CA2015/000506
§ 371 (c)(1),
(2) Date: Mar. 27, 2017

(87) PCT Pub. No.: WO2016/044922
PCT Pub. Date: Mar. 31, 2016

(65) Prior Publication Data
US 2017/0209401 A1 Jul. 27, 2017

Related U.S. Application Data

(60) Provisional application No. 62/055,823, filed on Sep. 26, 2014, provisional application No. 62/087,156, filed on Dec. 3, 2014.

(51) Int. Cl.
| | | |
|---|---|---|
| *A61K 31/198* | (2006.01) | |
| *A61K 35/15* | (2025.01) | |
| *A61K 35/33* | (2015.01) | |
| *A61K 39/00* | (2006.01) | |

(52) U.S. Cl.
CPC ............ *A61K 31/198* (2013.01); *A61K 35/15* (2013.01); *A61K 35/33* (2013.01); *A61K 39/0005* (2013.01); *A61K 2039/5154* (2013.01)

(58) Field of Classification Search
None
See application file for complete search history.

(56) References Cited

U.S. PATENT DOCUMENTS

| 10,874,727 B2 * | 12/2020 | Riley ............... A61K 39/0008 |
|---|---|---|
| 2013/0102496 A1 | 4/2013 | Flechtner et al. |
| 2013/0315904 A1 | 11/2013 | Orban |
| 2014/0037607 A1 | 2/2014 | Hocini et al. |

FOREIGN PATENT DOCUMENTS

| JP | 2006511208 A | 4/2006 | |
|---|---|---|---|
| JP | 2014111631 A | 6/2014 | |
| WO | 2004024902 A1 | 3/2004 | |
| WO | WO 2004/060369 A1 | 7/2004 | |
| WO | WO 2010/041288 A1 | 4/2010 | |
| WO | 2012007950 A2 | 1/2012 | |
| WO | 2012007950 A3 | 1/2012 | |
| WO | WO-2013190127 A1 * | 12/2013 | ............ A61K 45/06 |

OTHER PUBLICATIONS

Curran, T-A, et al. Immunobiology 2013;219:17-24.*
Haniffa, M.A., et al. J. Immunol. 2007;179:1595-1604.*
Putnam, A.L., et al. Diabetes, 2009;58:652-662.*
Umetsu 1985 (J. Clin Invest. 76(1):254-260) (Year: 1985).*
Alexander, A. M. et al., "Indoleamine 2,3-Dioxygenase Expression in Transplanted NOD Islets Prolongs Graft Survival After Adoptive Transfer of Diabetogenic Splenocytes." *Diabetes*, Feb. 2002, 51: 356-365.
Hosseini-Tabatabaei, A. et al., "Embedding Islet in a Liquid Scaffold Increases Islet Viability and Function." *Can. J. Diabetes*, 2013, 37: 27-35.
Jalili, R. B. et al., "Local Expression of Indoleamine 2,3 Dioxygenase in Syngeneic Fibroblasts Significantly Prolongs Survival of an Engineered Three-Dimensional Islet Allograft." *Diabetes*, Sep. 2010, 59: 2219-2227.
Spano, F., Donovan, J.C., "Alopecia areata Part 1: pathogenesis, diagnosis, and prognosis." *Canadian Family Physician*, 61: 751-761.
Forouzandeh, F., et al., "Local expression of indoleamine 2,3-dioxygenase suppresses T-cell-mediated rejection of an engineered bilayer skin substitute." Wound Repair and Regeneration, 2010, 18: 614-623.
Belladonna, M. L., et al., "Immunosuppression via tryptophan catabolism: the role of kynurenine pathway enzymes." Transplantation, 2007, 84(1S): S17-S20.
Chess, A. C., et al., "Elevations of endogenous kynurenic acid produce spatial working memory deficits." Schizophrenia bulletin, 2007, 33(3): 797-804.
Fallarino, F., et al., "Therapy of experimental type 1 diabetes by isolated Sertoli cell xenografts alone." Journal of Experimental Medicine, 2009, 206(11): 2511-2526.
Fallarino, F., et al., "The combined effects of tryptophan starvation and tryptophan catabolites down-regulate T cell receptor ζ-chain and induce a regulatory phenotype in naive T cells." The Journal of Immunology,2006, 176(11): 6752-6761.
O'Connor, J. C., et al., "Lipopolysaccharide-induced depressive-like behavior is mediated by indoleamine 2, 3-dioxygenase activation in mice." Molecular psychiatry, 2009, 14(5): 511-522.

(Continued)

*Primary Examiner* — Daniel E Kolker
(74) *Attorney, Agent, or Firm* — SALIWANCHIK, LLOYD & EISENSCHENK

(57) ABSTRACT

This invention provides combinations of kynurenine and antigen presenting cells (APC) for modulating immune tolerance, wherein the combinations may be used to modulate an autoimmune response, which may be of use in the treatment of Type 1 Diabetes (TID)) or alopecia areata (AA). Uses of kynurenine and antigen presenting cells (APC) as an immune modulator for the treatment of TID or AA are also provided.

23 Claims, 4 Drawing Sheets

(56) References Cited

OTHER PUBLICATIONS

Platten, M., et al., "Treatment of autoimmune neuroinflammation with a synthetic tryptophan metabolite." Science, 2005, 310(5749): 850-855.

Varga, D., et al. "Systemic L-Kynurenine sulfate administration disrupts object recognition memory, alters open field behavior and decreases c-Fos immunopositivity in C57BI/6 mice." Frontiers in Behavioral Neuroscience, 2015, 9(157): 1-11.

Alkhalifah, A., et al., "Alopecia areata update. Part I. Clinical picture, histopathology, and pathogenesis." The American Academy of Dermatology, 2010, 62: 177-188.

Arca, E., et al., "Interferon-gamma in alopecia areata." Eur J Dermatol., 2004, 14(1): 33-36; abstract.

Asp, L., et al., "Effects of pro-inflammatory cytokines on expression of kynurenine pathway enzymes in human dermal fibroblasts." Journal of Inflammation, 2011, 8(25): 1-7.

Elizei, S.S., et al., "Kynurenic acid downregulates IL-17/1L-23 axis in vitro." Mol Cell Biochem, 2017, 431: 55-65.

Leklem, J.E., et al., "Effect of oral contraceptives on urinary metabolite excretions after administration of L-tryptophan or L-kynurenine sulfate." Metabolism, 1973, 22(12): 1499-1505; abstract.

Limat, A., et al., "Soluble factors from human hair papilla cells and dermal fibroblasts dramatically increase the clonal growth of outer root sheath cells." Arch Dermatol Res, 1993, 285: 205-210.

Thomson, A.W., et al., "Tolerogenic dendritic cells for autoimmune disease and transplantation." Ann Rheum Dis, 2008, 67(Suppl III): iii90-iii96.

Li, Y., et al., "Kynurenine Increases Matrix Metalloproteinase-1 and -3 Expression in Cultured Dermal Fibroblasts and Improves Scarring In Vivo." Journal of Investigative Dermatology, 2014, 134: 643-650.

Poormasjedi-Meibod, M.-S., et al. "Anti-Scarring Properties of Different Tryptophan Derivatives." PloS one, 2014, 9(3): e91955, pp. 1-13.

\* cited by examiner

COMBINATION OF KYNURENINE AND ANTIGEN PRESENTING CELLS (APC) AS THERAPEUTICS AND METHODS FOR THEIR USE IN IMMUNE MODULATION

CROSS REFERENCE TO RELATED APPLICATIONS

This application claims the benefit of U.S. Provisional Patent Application Ser. Nos. 62/055,823 filed on 26 Sep. 2014 and 62/087,156 filed on 3 Dec. 2014, both entitled "A Combination of Kynurenine and Antigen Presenting Cells (APC) as Therapeutics and Methods for their Use in Immune Modulation" and "Therapeutics and Methods for their Use in the Treatment and Prevention of Alopecia Areata", respectively.

TECHNICAL FIELD

This invention relates to therapeutics, their uses and methods for the treatment of various indications, including various autoimmune disorders. In particular the invention relates to therapies and methods for the treatment of type 1 diabetes (TID) and alopecia areata (AA).

BACKGROUND

Type 1 diabetes (T1D), is also known as diabetes mellitus type 1 or insulin dependent or juvenile diabetes. T1D is thought to be caused by autoimmune destruction of insulin-producing beta cells in the pancreas, whereby the pancreas does not produce insulin or sufficient insulin. Accordingly, glucose builds up in your blood instead of being utilized. The lack of insulin in T1D patients leads to increased blood and urine glucose.

The incidence of T1D may be anywhere from 1/100,000 to as high as 35/100,000 depending on the geographic region.

High blood glucose levels may result in numerous complications. For example, heart disease, kidney disease, nerve damage, blindness, and erectile dysfunction. However, proper management can delay or even in some cases prevent the onset of T1D complications. T1D is fatal unless treated with insulin.

Alopecia areata (AA) is an autoimmune disease affecting millions of people worldwide. It manifests as a sudden loss of hair without associated visible scarring or inflammation of the skin. In 5% of patients affected by AA, the condition can extend to involve the entire scalp (alopecia totalis (AT)) or the whole body (alopecia universalis; AU). AA can involve nail changes, increased atopy, and other associated autoimmune and endocrine disorders, such as thyroid disease.

A study conducted in the United States indicates the yearly incidence of the skin disorder to be 20.2 per 100,000 people and the overall lifetime risk is 1.7% (Safavi et al., 1995). AA rates are similar in both men and women and the majority of patients are between the ages of 30-59 (Wang and McElwee, 2011). AA tends to worsen with time in children and be more persistent (Alkhalifah et al., 2010). High rates of anxiety and major depression have been shown to be co-morbid with AA (Colón et al, 1991). The prognosis of AA is worse in patients who have AT or AU, an ophiasis pattern of hair loss, a family history of the condition, disease onset at a younger age, nail involvement, and other coexisting autoimmune diseases (Alkhalifah et al., 2010).

SUMMARY

This invention is based in part on the discovery that combinations of kynurenine and antigen presenting cells (APC) described herein, modulate an immune response. The immune modulation may have an anti-inflammatory activity. Specifically, the combinations of kynurenine and antigen presenting cells (APC) described herein, may be used to modulate an autoimmune response, which may be of use in the treatment of type 1 diabetes (T1D) or alopecia areata (AA).

In accordance with one embodiment, there is provided a method of treating T1D or AA, in a mammal in need thereof, the method including: (a) administration of an antigen presenting cell (APC) to the mammal; and (b) administration of a kynurenine to the mammal.

In accordance with another embodiment, there is provided a use of (a) an antigen presenting cell (APC); and (b) a kynurenine; for the treatment of T1D or AA in a mammal. Alternatively, the use may also be in the manufacture of one or more medicaments including and APC and kyurenine or a kyurenine analogue, for the treatment of T1D.

In accordance with another embodiment, there is provided a kynurenine for treating T1D or AA, where the subject has been previously administered APCs.

In accordance with another embodiment, there is provided a pharmaceutical composition for treating disease T1D or AA, the composition including kynurenine, APCs, and a pharmaceutically acceptable carrier.

In accordance with another embodiment, there is provided a commercial package including (a) kynurenine; (b) APCs; and (c) instructions for the use thereof for treating T1D or AA.

The APC may be allogenic. The APC may be syngenic. The APC may be a non-professional APC. The APC may be a professional APC. The APC and the kynurenine may be co-administered.

The co-administration may be simultaneous. The co-administration may be consecutive. The APC may be administered before the kynurenine. The kynurenine may be administered before the APC. The APC may be administered intraperitoneally. The kynurenine may be administered orally. The APC may be selected from one or more of the following: fibroblasts, thymic epithelial cells, thyroid epithelial cells, glial cells, beta-cells, and endothelial cells. The APCs may be fibroblast cells. The mammal may be a human. The mammal may be a human with T1D. The mammal may be a human with T1D, the APC may be a fibroblast. The kynurenine may be selected from one of more of DL-kynurenine, L-kynurenine, D-kynurenine, and 3-hydroxy-DL-kynurenine. The kynurenine may be selected from one of more of DL-kynurenine, L-kynurenine, D-kynurenine, 3-hydroxy-DL-kynurenine, 3-hydroxy-L-kynurenine, 3-hydroxy-D-kynurenine, 5-hydroxy-DL-kynurenine, 5-hydroxy-L-kynurenine, 5-hydroxy-D-kynurenine, N'-formyl-kynurenine, N-acetyl-3-OH-kynurenine, 4-chloro-DL-kynurenine, kynurenine, butyl ester, and kynurenic acid. The kynurenine may be an isomer of kynurenine or an analog thereof.

The method may further include periodic kynurenine administration following the initial administration of APC and kynurenine. Where the mammal may be a human with T1D, the method may further include an allogenic islet transplant. Where the mammal may be a human with T1D, and the APC may be a fibroblast, the method may further include an allogenic islet transplant.

DETAILED DESCRIPTION

Figure 1:
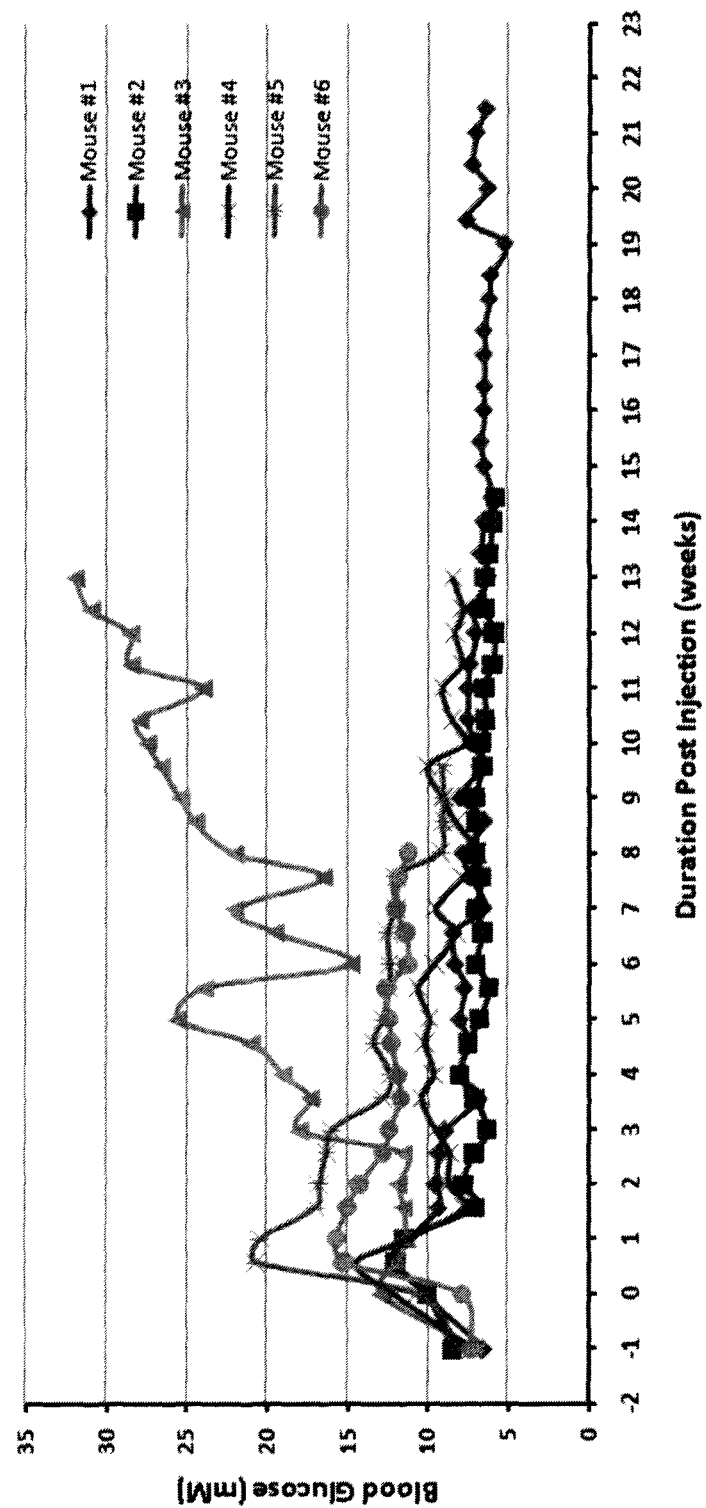
FIG. 1 shows the blood glucose over time of six non-obese diabetic (NOD) mice that were given intraperitoneal fibroblast injections and daily subcutaneous kynurenine injections.

As used herein, "type 1 diabetes" (T1D), also known as diabetes mellitus type 1 or insulin dependent or juvenile diabetes, is thought to be caused by autoimmune destruction of insulin-producing beta cells in the pancreas, whereby the pancreas does not produce insulin or sufficient insulin. Accordingly, glucose builds up in your blood instead of being utilized. The lack of insulin in T1D patients leads to increased blood and urine glucose.

The incidence of T1D may be anywhere from 1/100,000 to as high as 35/100,000 depending on the geographic region. T1D is fatal unless treated with insulin. Diagnosis of T1D usually occurs before the age of 30, but is most often detected during childhood or during teenage years. Insulin therapy is the standard treatment for T1D. Insulin may be administered by syringe, pen or pump. There are many types of insulin available, which may permit for flexibility in the number of injections and the timing of injections. High blood glucose levels may result in numerous complications. For example, heart disease, kidney disease, nerve damage, blindness, and erectile dysfunction. However, proper management can delay or even in some cases prevent the onset of T1D complications.

T1D patients can manage their diabetes by careful adherence to an insulin administration regimen, blood glucose level monitoring, eating a balanced diet, through physical activity, maintaining cholesterol levels, maintaining other blood fat levels, maintaining a healthy weight, maintaining healthy blood pressure, maintaining general good health.

As used herein, "alopecia areata" (AA), is an autoimmune disease, widely accepted to be a cell-mediated autoimmune disorder, though the identity of the exact primary antigen target(s) attacked are yet to be discovered (Wang and McElwee, 2011). It manifests as a sudden loss of hair without associated visible scarring or inflammation of the skin. AA can extend to involve the entire scalp (alopecia totalis (AT)) or the whole body (alopecia universalis; AU). However, other tissues may be involved (for example, nail changes, increased atopy, and other associated autoimmune and endocrine disorders, such as thyroid disease). In the United States, incidence of AA is 20.2 per 100,000 people and the overall lifetime risk is 1.7%. Furthermore, AA rates are similar in both men and women and the majority of patients are between the ages of 30 and 59. AA tends to worsen with time in children and be more persistent (Alkhalifah et al., 2010). The prognosis of AA is worse in patients who have AT or AU, an ophiasis pattern of hair loss, a family history of the condition, disease onset at a younger age, nail involvement, and other coexisting autoimmune diseases (Alkhalifah et al., 2010).

Kynurenine is an aromatic amino acid that is a product of tryptophan metabolism. Kynurenine is a precursor of kynurenic acid and an intermediate in the conversion of tryptophan to niacin. As used herein kynurenine is meant to encompass various kynurenines and kynurenine analogs. For example, DL-kynurenine, L-kynurenine, D-kynurenine, 3-hydroxy-DL-kynurenine, 3-hydroxy-L-kynurenine, 3-hydroxy-D-kynurenine, 5-hydroxy-DL-kynurenine, 5-hydroxy-L-kynurenine, 5-hydroxy-D-kynurenine, N'-formyl-kynurenine, N-acetyl-3-OH-kynurenine, 4-chloro-DL-kynurenine, kynurenine, butyl ester, and kynurenic acid as shown below in TABLE 1.

TABLE 1

| Kynurenine and Kynurenine Analogs | |
|---|---|
| Kynurenine | Structure |
| DL-kynurenine | [structure] |
| L-kynurenine | [structure] |
| D-kynurenine | [structure] |
| 3-hydroxy-DL-kynurenine | [structure] |
| 3-hydroxy-L-kynurenine | [structure] |
| 3-hydroxy-D-kynurenine | [structure] |

TABLE 1-continued

Kynurenine and Kynurenine Analogs

| Kynurenine | Structure |
|---|---|
| 5-hydroxy-DL-kynurenine | (structure) |
| 5-hydroxy-L-kynurenine | (structure) |
| 5-hydroxy-D-kynurenine | (structure) |
| N'-formyl-kynurenine | (structure) |
| N-acetyl-3-OH-kynurenine | (structure) |
| 4-chloro-kynurenine (4-chloro-DL-kynurenine) | (structure) |
| kynurenine, butyl ester | (structure) |
| kynurenic Acid | (structure) |

All of the kynurenine and kynurenine analogs described herein are commercially available (for example, L-kynurenine from Sigma™ #K8625; D-kynurenine from Sigma™ #K2380; 3-hydroxy-DL-kynurenine from Sigma™ #H1771; DL-kynurenine from Sigma™ #61250; kynurenic acid from Sigma™ #K3375; 3-hydroxy-DL-kynurenine from Sigma™ #H1771).

It will be appreciated by a person of skill in the art that these are just examples of kynurenine compounds and analogs thereof, and that additional analogs are known in the art. Furthermore, D or L isomers are possible for each of the racemates, where the individual isomers are not shown.

Antigen presenting cells (APC) (also known as accessory cells) are cells which display foreign antigen bound to a major histocompatibility complex (MHC) on their cell surface. Subsequently, the APC with antigen bound to MHC may be recognized by T-cells via the T-cell receptors (TCRs). As used herein APC is meant to encompass both non-professional APCs (for example, fibroblasts, thymic epithelial cells, thyroid epithelial cells, glial cells, beta-cells, endothelial cells) and professional APCs (for example, dendritic cells, macrophages, B-cells, and activated epithelial cells). APCs are also meant to encompass both allogenic and syngenic cells.

As used herein "treatment" may include one or more of the following: prevention; amelioration; reduction of symptoms; slowing the progression; or elimination; of a disease or a condition.

It will be understood by a person of skill that COOH and $NR_2$ may include the corresponding ions, for example carboxylate ions and ammonium ions, respectively. Alternatively, where the ions are shown, a person of skill in the art will appreciate that the counter ion may also be present.

Those skilled in the art will appreciate that the point of covalent attachment of a moiety to kynurenine as described herein may be, for example, and without limitation, cleaved under specified conditions. Specified conditions may include, for example, and without limitation, in vivo enzymatic or non-enzymatic means. Cleavage of the moiety may occur, for example, and without limitation, spontaneously, or it may be catalyzed, induced by another agent, or a change in a physical parameter or environmental parameter, for example, an enzyme, light, acid, temperature or pH. The moiety may be, for example, and without limitation, a protecting group that acts to mask a functional group, a group that acts as a substrate for one or more active or passive transport mechanisms, or a group that acts to impart or enhance a property of the kynurenine, for example, solubility, bioavailability or localization.

In some embodiments, the combinations of kynurenine and antigen presenting cells (APC) described herein to modulate immune tolerance as described above may be used for systemic treatment of T1D or AA. In some embodiments the combinations of kynurenine and antigen presenting cells (APC) described herein may be used in the preparation of a medicament or a composition for systemic treatment of T1D or AA. In some embodiments, methods of systemically treating T1D or AA are also provided.

Compounds as described herein may be in the free form or in the form of a salt thereof. In some embodiment, compounds as described herein may be in the form of a pharmaceutically acceptable salt, which are known in the art (Berge S. M. et al., 1977). Pharmaceutically acceptable salt as used herein includes, for example, salts that have the desired pharmacological activity of the parent compound (salts which retain the biological effectiveness and/or properties of the parent compound and which are not biologically and/or otherwise undesirable). Compounds as described herein having one or more functional groups capable of forming a salt may be, for example, formed as a pharmaceutically acceptable salt. Compounds containing one or more basic functional groups may be capable of forming a pharmaceutically acceptable salt with, for example, a pharmaceutically acceptable organic or inorganic acid. Pharmaceutically acceptable salts may be derived from, for example, and without limitation, acetic acid, adipic acid, alginic acid, aspartic acid, ascorbic acid, benzoic acid, benzenesulfonic acid, butyric acid, cinnamic acid, citric acid, camphoric acid, camphorsulfonic acid, cyclopentanepropionic acid, diethylacetic acid, digluconic acid, dodecylsulfonic acid, ethanesulfonic acid, formic acid, fumaric acid, glucoheptanoic acid, gluconic acid, glycerophosphoric acid, glycolic acid, hemisulfonic acid, heptanoic acid, hexanoic acid, hydrochloric acid, hydrobromic acid, hydriodic acid, 2-hydroxyethanesulfonic acid, isonicotinic acid, lactic acid, malic acid, maleic acid, malonic acid, mandelic acid, methanesulfonic acid, 2-napthalenesulfonic acid, naphthalenedisulphonic acid, p-toluenesulfonic acid, nicotinic acid, nitric acid, oxalic acid, pamoic acid, pectinic acid, 3-phenylpropionic acid, phosphoric acid, picric acid, pimelic acid, pivalic acid, propionic acid, pyruvic acid, salicylic acid, succinic acid, sulfuric acid, sulfamic acid, tartaric acid, thiocyanic acid or undecanoic acid. Compounds containing one or more acidic functional groups may be capable of forming pharmaceutically acceptable salts with a pharmaceutically acceptable base, for example, and without limitation, inorganic bases based on alkaline metals or alkaline earth metals or organic bases such as primary amine compounds, secondary amine compounds, tertiary amine compounds, quaternary amine compounds, substituted amines, naturally occurring substituted amines, cyclic amines or basic ion-exchange resins. Pharmaceutically acceptable salts may be derived from, for example, and without limitation, a hydroxide, carbonate, or bicarbonate of a pharmaceutically acceptable metal cation such as ammonium, sodium, potassium, lithium, calcium, magnesium, iron, zinc, copper, manganese or aluminum, ammonia, benzathine, meglumine, methylamine, dimethylamine, trimethylamine, ethylamine, diethylamine, triethylamine, isopropylamine, tripropylamine, tributylamine, ethanolamine, diethanolamine, 2-dimethylaminoethanol, 2-diethylaminoethanol, dicyclohexylamine, lysine, arginine, histidine, caffeine, hydrabamine, choline, betaine, ethylenediamine, glucosamine, glucamine, methylglucamine, theobromine, purines, piperazine, piperidine, procaine, N-ethylpiperidine, theobromine, tetramethylammonium compounds, tetraethylammonium compounds, pyridine, N,N-dimethylaniline, N-methylpiperidine, morpholine, N-methylmorpholine, N-ethylmorpholine, dicyclohexylamine, dibenzylamine, N,N-dibenzylphenethylamine, 1-ephenamine, N,N'-dibenzylethylenediamine or polyamine resins. In some embodiments, compounds as described herein may contain both acidic and basic groups and may be in the form of inner salts or zwitterions, for example, and without limitation, betaines. Salts as described herein may be prepared by conventional processes known to a person skilled in the art, for example, and without limitation, by reacting the free form with an organic acid or inorganic acid or base, or by anion exchange or cation exchange from other salts. Those skilled in the art will appreciate that preparation of salts may occur in situ during isolation and purification of the compounds or preparation of salts may occur by separately reacting an isolated and purified compound.

In some embodiments, compounds and all different forms thereof (e.g. free forms, salts, polymorphs, isomeric forms) as described herein may be in the solvent addition form, for example, solvates. Solvates contain either stoichiometric or non-stoichiometric amounts of a solvent in physical association the compound or salt thereof. The solvent may be, for example, and without limitation, a pharmaceutically acceptable solvent. For example, hydrates are formed when the solvent is water or alcoholates are formed when the solvent is an alcohol.

In some embodiments, compounds and all different forms thereof (e.g. free forms, salts, solvates, isomeric forms) as described herein may include crystalline and amorphous forms, for example, polymorphs, pseudopolymorphs, conformational polymorphs, amorphous forms, or a combination thereof. Polymorphs include different crystal packing arrangements of the same elemental composition of a compound. Polymorphs usually have different X-ray diffraction patterns, infrared spectra, melting points, density, hardness, crystal shape, optical and electrical properties, stability and/or solubility. Those skilled in the art will appreciate that various factors including recrystallization solvent, rate of crystallization and storage temperature may cause a single crystal form to dominate.

In some embodiments, compounds and all different forms thereof (e.g. free forms, salts, solvates, polymorphs) as described herein include isomers such as geometrical isomers, optical isomers based on asymmetric carbon, stereoisomers, tautomers, individual enantiomers, individual diastereomers, racemates, diastereomeric mixtures and combinations thereof, and are not limited by the description of the formulas illustrated for the sake of convenience.

In some embodiments, pharmaceutical compositions as described herein may comprise a salt of such a compound, preferably a pharmaceutically or physiologically acceptable salt. Pharmaceutical preparations will typically comprise one or more carriers, excipients or diluents acceptable for the mode of administration of the preparation, be it by injection, inhalation, topical administration, lavage, or other modes suitable for the selected treatment. Suitable carriers, excipients or diluents (used interchangeably herein) are those known in the art for use in such modes of administration.

Suitable pharmaceutical compositions may be formulated by means known in the art and their mode of administration and dose determined by the skilled practitioner. For parenteral administration, a compound may be dissolved in sterile water or saline or a pharmaceutically acceptable vehicle used for administration of non-water soluble compounds such as those used for vitamin K. For enteral administration, the compound may be administered in a tablet, capsule or dissolved in liquid form. The tablet or capsule may be enteric coated, or in a formulation for sustained release. Many suitable formulations are known, including, polymeric or protein microparticles encapsulating a compound to be released, ointments, pastes, gels, hydrogels, or solutions which can be used topically or locally to administer a compound. A sustained release patch or implant may be employed to provide release over a prolonged period of time. Many techniques known to one of skill in the art are described in *Remington: the Science & Practice of Pharmacy* by Alfonso Gennaro, 20$^{th}$ ed., Lippencott Williams & Wilkins, (2000). Formulations for parenteral administration may, for example, contain excipients, polyalkylene glycols such as polyethylene glycol, oils of vegetable origin, or hydrogenated naphthalenes. Biocompatible, biodegradable lactide polymer, lactide/glycolide copolymer, or polyoxyethylene-polyoxypropylene copolymers may be used to control the release of the compounds. Other potentially useful parenteral delivery systems for modulatory compounds include ethylene-vinyl acetate copolymer particles, osmotic pumps, implantable infusion systems, and liposomes. Formulations for inhalation may contain excipients, for example, lactose, or may be aqueous solutions containing, for example, polyoxyethylene-9-lauryl ether, glycocholate and deoxycholate, or may be oily solutions for administration in the form of nasal drops, or as a gel.

Compounds or pharmaceutical compositions as described herein or for use as described herein may be administered by means of a medical device or appliance such as an implant, graft, prosthesis, stent, etc. Also, implants may be devised which are intended to contain and release such compounds or compositions. An example would be an implant made of a polymeric material adapted to release the compound over a period of time.

As used herein, a "medicament" is a composition capable of producing an effect that may be administered to a patient or test subject. The effect may be chemical, biological or physical, and the patient or test subject may be human, or a non-human animal, such as a rodent or transgenic mouse. The composition may include small organic or inorganic molecules with distinct molecular composition made synthetically, found in nature, or of partial synthetic origin. Included in this group are nucleotides, nucleic acids, amino acids, peptides, polypeptides, proteins, or complexes comprising at least one of these entities. The medicament may be comprised of the effective composition alone or in combination with a pharmaceutically acceptable excipient.

As used herein, a "pharmaceutically acceptable excipient" includes any and all solvents, dispersion media, coatings, antibacterial, antimicrobial or antifungal agents, isotonic and absorption delaying agents, and the like that are physiologically compatible. The excipient may be suitable for intravenous, intraperitoneal, intramuscular, intrathecal or oral administration. The excipient may include sterile aqueous solutions or dispersions for extemporaneous preparation of sterile injectable solutions or dispersion. Use of such media for preparation of medicaments is known in the art.

An "effective amount" of a pharmaceutical composition as described herein includes a therapeutically effective amount or a prophylactically effective amount. A "therapeutically effective amount" refers to an amount effective, at dosages and for periods of time necessary, to achieve the desired therapeutic result, such as reduced symptoms, increased life span or increased life expectancy. A therapeutically effective amount of a compound may vary according to factors such as the disease state, age, sex, and weight of the subject, and the ability of the compound to elicit a desired response in the subject. Dosage regimens may be adjusted to provide the optimum therapeutic response. A therapeutically effective amount is also one in which any toxic or detrimental effects of the compound are outweighed by the therapeutically beneficial effects. A "prophylactically effective amount" refers to an amount effective, at dosages and for periods of time necessary, to achieve the desired prophylactic result (for example, reduced blood glucose over time, more stable blood glucose, increased quality of life, increased life span, increased life expectancy, or prevention of the progression of the diabetes for T1D; a reduction in the rate of hair loss and reduced hair loss or hair regrowth for AA). Typically, a prophylactic dose is used in subjects prior to or at an earlier stage of disease, so that a prophylactically effective amount may be less than a therapeutically effective amount.

It is to be noted that dosage values may vary with the severity of the condition to be alleviated. For any particular subject, specific dosage regimens may be adjusted over time according to the individual need and the professional judgment of the person administering or supervising the administration of the compositions. Dosage ranges set forth herein are exemplary only and do not limit the dosage ranges that may be selected by medical practitioners. The amount of active compound(s) in the composition may vary according to factors such as the disease state, age, sex, and weight of the subject. Dosage regimens may be adjusted to provide the optimum therapeutic response. For example, a single bolus may be administered, several divided doses may be administered over time or the dose may be proportionally reduced or increased as indicated by the exigencies of the therapeutic situation. It may be advantageous to formulate parenteral compositions in dosage unit form for ease of administration and uniformity of dosage.

In general, compounds as described herein should be used without causing substantial toxicity. Toxicity of the compounds as described herein can be determined using standard techniques, for example, by testing in cell cultures or experimental animals and determining the therapeutic index, i.e., the ratio between the LD50 (the dose lethal to 50% of the population) and the LD100 (the dose lethal to 100% of the population). In some circumstances however, such as in severe disease conditions, it may be appropriate to administer substantial excesses of the compositions. Some compounds as described herein may be toxic at some concentrations. Titration studies may be used to determine toxic and non-toxic concentrations. Toxicity may be evaluated by examining a particular compound's or composition's specificity across cell lines using PC3 cells as a negative control that do not express AR. Animal studies may be used to provide an indication if the compound has any effects on other tissues. Systemic therapy that targets the AR will not likely cause major problems to other tissues since anti-androgens and androgen insensitivity syndrome are not fatal.

Compounds as described herein may be administered to a subject. As used herein, a "subject" may be a human, non-human primate, rat, mouse, cow, horse, pig, sheep, goat, dog, cat, etc. The subject may be suspected of having or at risk for having an autoimmune disease, such as T1D or AA. Diagnostic methods for T1D or AA are known to those of ordinary skill in the art.

Various alternative embodiments and examples of the invention are described herein. These embodiments and examples are illustrative and should not be construed as limiting the scope of the invention.

Materials and Methods

Type 1 Diabetes Mice

Non-obese diabetic (NOD) mice were intraperitoneal (IP) injected with normal fibroblasts (non-IDO-expressing, $2\times10^7$ cells per mouse) at the onset of hyperglycemia. Following IP fibroblast injection, the mice were given daily subcutaneous DL-kynurenine injections (20 µg/mouse). The blood glucose levels were monitored twice a week. For the controls, mice were either given only the IP fibroblast injection, or only the daily subcutaneous kynurenine injections as set out above, or were give no treatment at all.

Alopecia Areata Mice

Prevention of alopecia areata by combination fibroblast+ kynurenine treatment: C3H/HeJ mice were induce to develop alopecia areata (AA) by intradermal injection of lymph node cells from AA affected mice. These mice (5 per group) then received either no treatment, a single-dose injection of $2\times10^6$ unmodified primary dermal fibroblasts to peritoneal cavity, oral kynurenine (added to drinking water, 100 µg/mL), or a combination therapy consisting of a) single-dose injection of $2\times10^6$ unmodified primary dermal fibroblasts to peritoneal cavity and b) oral kynurenine (added to drinking water, 100 µg/mL).

Examples

Example 1—Co-Administration of Kynurenine and APCs to NOD Mice

Figure 2A:
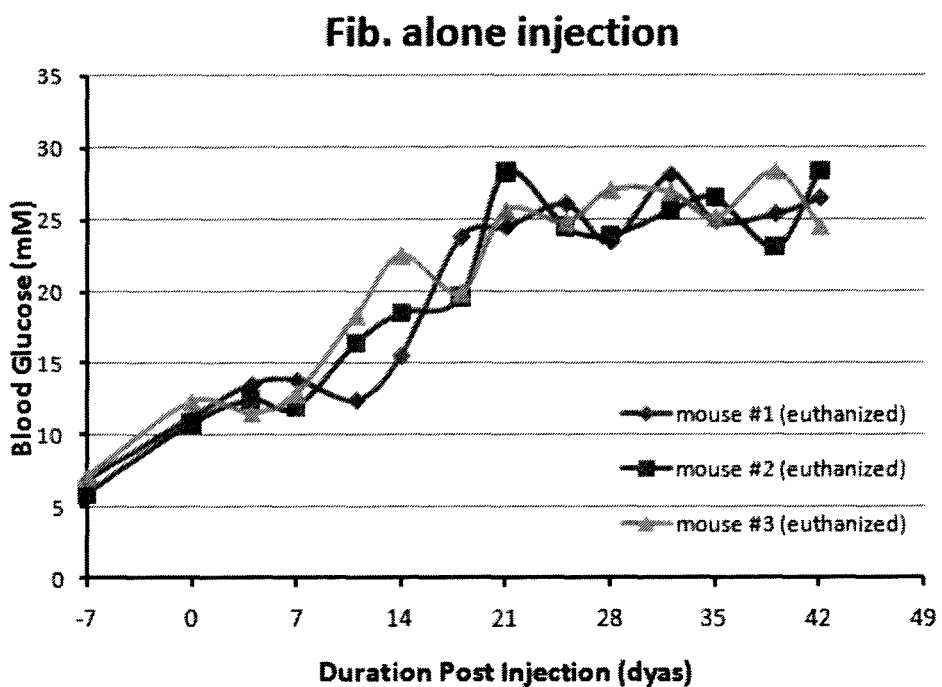
FIG. 2A shows the blood glucose over time of three non-obese diabetic (NOD) mice that were given intraperitoneal fibroblast injections.
Figure 2B:
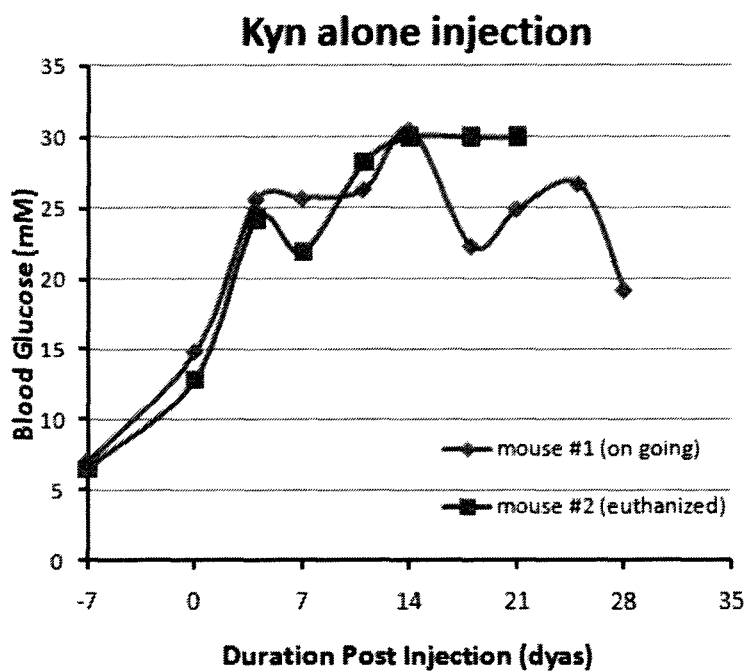
FIG. 2B shows the blood glucose over time of two non-obese diabetic (NOD) mice that were given daily subcutaneous kynurenine injections.
Figure 3:
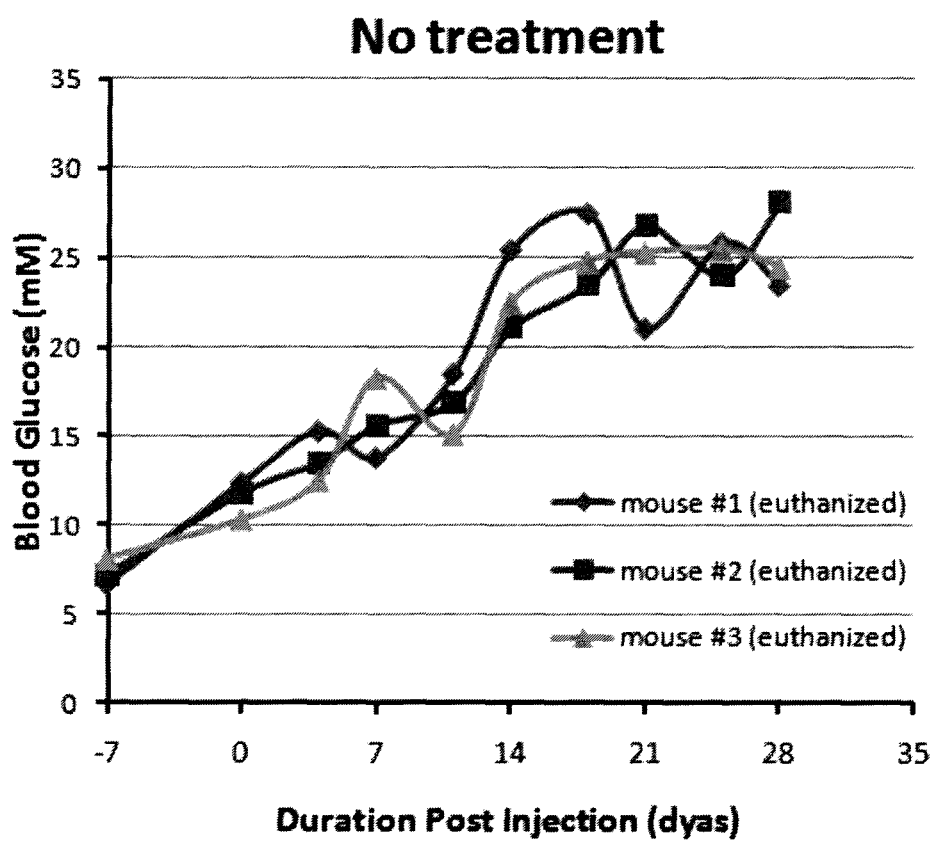
FIG. 3 shows the blood glucose over time of three non-obese diabetic (NOD) mice that were given no treatment.

The administration of kynurenine and fibroblasts to NOD mice showed a significant decrease in blood glucose levels over an extended period of time even after kynurenine injections were stopped (see FIG. 1), as compared to controls where fibroblasts alone were administered (see FIG. 2A), where kynurenine alone was administered (see FIG. 2B), or untreated mice (see FIG. 3).

FIGS. 1, 2A, 2B, and 3 show a profile of blood glucose (mM) measurements as a function of time post IP fibroblast injection in FIGS. 1 and 2A, post hyperglycemia in FIGS. 2B and 3. FIG. 1 shows 6 mice, five of which show a significant decrease in blood glucose levels following IP fibroblast injection and daily subcutaneous kynurenine injections. In four of the 5 mice shown in FIG. 1, the blood glucose was reduced to less than 10 mM.

Furthermore, in mouse 1 and mouse 2 (shown in FIG. 1) the subcutaneous kynurenine injections were stopped at 119 and 77 days post IP fibroblast injection, respectively, without a subsequent increase in blood glucose above 10 mM. Kyn injections were done daily because it was cleared from the blood within 8-10 hours. Glucose levels were monitored for up to 120 days, but control groups were sacrificed at earlier time points due to a high level of glucose and prevent the mice from suffering.

Example 2—Co-Administration of Kynurenine and APCs to C3H/HeJ Mice

Figure 4A:
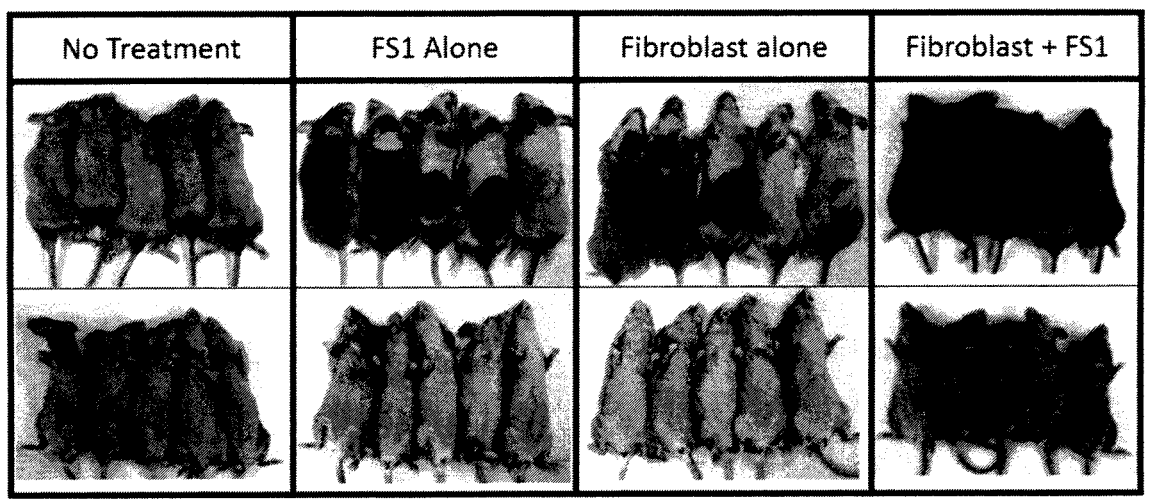
FIG. 4 shows the administration of fibroblasts and kynurenine can prevent development of alopecia areata, and reduce inflammatory response.
Figure 4B:
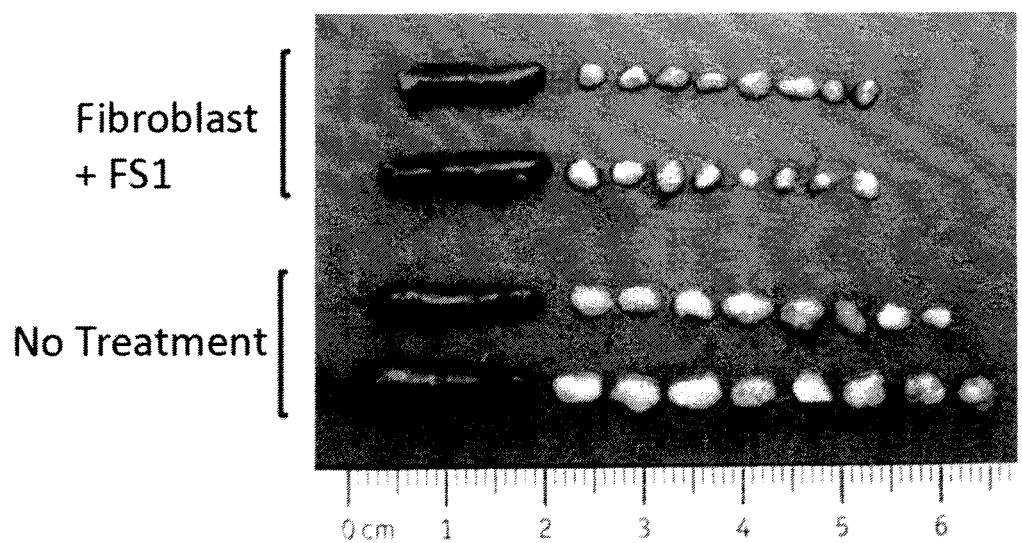

The administration of kynurenine and fibroblasts to C3H/ HeJ mice showed a significant decrease in hair loss over an extended period of time. FIG. 4A show hair loss pattern after 120 days in control and treated groups. The untreated mice show sever hair loss, while the kynurenine (FS1 alone) and the fibroblast alone mice show some hair growth, the kynurenine (FS1) and fibroblast treated mice have complete hair coverage or slight hair loss. TABLE 2 shows AA rate in control (100%) vs. combination treatment group (22%). Of note is that one of the two AA cases in the combination treatment group show a remarkably milder hair loss compared with the control mice. FIG. 4B reveals that the size of the lymph nodes and spleen in combination therapy treated mice were significantly smaller than that of non-treated AA mice, consistent with an absence of an inflammatory response.

| Treatment | Total | AA | Normal | Prevention (%) |
|---|---|---|---|---|
| No treatment | 5 | 5 | 0 | 0% |
| FS1 alone | 5 | 4 | 1 | 20% |
| Fibroblast alone | 5 | 5 | 0 | 0% |
| Fibroblast + FS1 | 9 | 2* | 7 | 78% |

*One of AA mice in Fib. + FS1 treatment group had only mild hair loss

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to an embodiment of the present invention. The invention includes all embodiments and variations substantially as hereinbefore described and with reference to the examples and drawings.

REFERENCES

Alkhalifah, A., Alsantali, A., Wang, E., McElwee, K. J., and Shapiro, J. Alopecia areata update. Part I. Clinical picture, histopathology, and pathogenesis. The American Academy of Dermatology, 2010. 62:177-188.

Colón, E. A., Popkin, M. K., Callies, A. L., Dessert, N.J., and Hordinsky, M. K. Lifetime prevalence of psychiatric disorders in patients with alopecia areata. Comprehensive Psychiatry, 1991. 32 (3): 245-251.

Milgraum, S. S., Mitchell, A. J., Bacon, G. E., and Rasmussen, J. E. Alopecia areata, endocrine function, and autoantibodies in patients 16 years of age or younger. Journal of the American Academy of Dermatology, 1987. 17:57-61.

Safavi, K. H., Muller, S. A., Suman, V. J., Moshell, A. N., and Melton, L. J. 3rd. Incidence of alopecia areata in Olmsted County, Minnesota, 1975 through 1989. Mayo Clinic Proceedings 1995. 70 (7): 628-633.

Wang, E. and McElwee, K. J. Etiopathogenesis of alopecia areata: Why do our patients get it?. Dermatologic Therapy, 2011. 24:337-347.

Berge S. M. et al., *J. Pharm. Sci.* (1977) 66 (1): 1-19.

What is claimed is:

1. A method of treating type 1 diabetes (T1D) or alopecia areata (AA), in a mammal in need thereof, the method comprising:
    (a) systemic administration of an antigen presenting cell (APC) to the mammal; and
    (b) administration of a kynurenine to the mammal.

2. The method of claim 1, wherein the APC is allogenic.

3. The method of claim 1, wherein the APC is syngenic.

4. The method of claim 1, wherein the APC is a non-professional APC.

5. The method of claim 1, wherein APC is a professional APC.

6. The method of claim 1, wherein the APC and the kynurenine are co-administered.

7. The method of claim 6, wherein the co-administration is simultaneously.

8. The method of claim 6, wherein the co-administration is consecutively.

9. The method of claim 8, wherein the APC is administered before the kynurenine.

10. The method of claim 8, wherein the kynurenine is administered before the APC.

11. The method of claim 1, wherein the APC is administered intraperitoneally.

12. The method of claim 1, wherein the kynurenine is administered orally.

13. The method of claim 1, wherein the APC is selected from one or more of the following: fibroblasts, thymic epithelial cells, thyroid epithelial cells, glial cells, beta-cells, and endothelial cells.

14. The method of claim 1, wherein the APCs are fibroblast cells.

15. The method of claim 1, wherein the kynurenine is selected from one of or more of kynurenic acid, DL-kynurenine, L-kynurenine, D-kynurenine, and 3-hydroxy-DL-kynurenine.

16. The method of claim 1, wherein the mammal is a human.

17. The method of claim 1, wherein the mammal is a human with T1D, and wherein the method further comprises an allogenic islet transplant.

18. The method of claim 1, wherein the mammal is a human with T1D, the APC is a fibroblast, and the method further comprises an allogenic islet transplant.

19. The method, according to claim 1, wherein the method does not comprise an islet cell transplant.

20. The method of claim 1, wherein the kynurenine is kynurenic acid.

21. The method of claim 1, wherein the kynurenine is selected from one or more of DL-kynurenine, L-kynurenine, and D-kynurenine.

22. A pharmaceutical composition for treating disease T1D or AA, comprising a kynurenine, APCs, and a pharmaceutically acceptable carrier.

23. A commercial package comprising (a) a kynurenine; (b) APCs; and (c) instructions for the use thereof for treating T1D or AA.

* * * * *